United States Patent Office 3,629,204
Patented Dec. 21, 1971

3,629,204
EPOXY RESIN COMPOSITION AND ITS
PRODUCTION
Mitsuo Yoshihara, Takatsuki, and Kazunori Mizutani,
Ibaraki, Japan, assignors to Nitto Electric Industrial
Co., Ltd., Ibaraki, Japan
No Drawing. Filed Aug. 29, 1969, Ser. No. 854,318
Claims priority, application Japan, Sept. 3, 1968,
43/63,231
Int. Cl. C08g 23/08
U.S. Cl. 260—78.4 EP                    9 Claims

ABSTRACT OF THE DISCLOSURE

Novel curable epoxy resin compositions with high arc and tracking resistance are provided by the present invention. The novel resins are prepared by reaction of a dicarboxylic acid diglycidyl ester with an aliphatic or alicyclic carboxylic acid ester which is then reacted with an aliphatic or alicyclic dicarboxylic acid anhydride. The product is then cured to obtain a viscous composition which may be further cured and molded.

---

This invention relates to an improved curable epoxy resin composition and its production. More particularly, this invention relates to an epoxy resin composition which is curable to a solid state excellent in arc-resistance and tracking-resistance and which has a desirable viscosity and therefore is suitable as a molding material in the form of a putty or pre-mix particularly for forming electric parts.

It has been conventional, for an electric insulating material, to use such inorganic material as porcelain or glass as generally seen in insulators. However, when such inorganic material is used under a high voltage or in a polluted atmosphere, it tends to be broken in the insulation. Further such inorganic material is low in mechanical strength and workability so that it has been proposed to replace such inorganic material with a synthetic resin material. However, such synthetic resin material has a drawback that it tends to produce a conductive carbon track while it is in use. So far as we know, there is no synthetic resin material satisfactory enough for the purpose.

There has been proposed in U.S. patent application Ser. No. 631,889 filed Apr. 19, 1967 an arc-resisting epoxy resin composition which consists predominantly of diglycidyl hexahydrophthalate. However, the above mentioned liquid composition has drawbacks that it is low in the viscosity so that it is difficult for use as pressure-molding or transfer-molding material and that the resulting cured product tends to crack.

Generally an electric insulating material for forming an electric part is required to have characteristics of well resisting to an arc-discharge generated under a high voltage and of enduring the use in such atmosphere as is polluted with salt or sulfur dioxide. However, when a synthetic resin is used as an electric insulating material, the insulation will be broken mostly by the generation of a conductive carbon track. For example, if an aromatic compound derivative having such carbon-carbon unsaturation as a benzene nucleus is contained as a component forming the resin, a conductive carbon track will be likely to be formed between the electrodes and the arc-resistance and tracking-resistance are lowered.

Therefore, it is an object of this invention to provide a novel epoxy resin composition which, when cured, is resistance to arc and to the formation of undesirable carbonized track, and has other excellent electric properties.

Another object of this invention is to provide an epoxy resin composition of the character mentioned just above and which has a proper viscosity and accordingly is useful for molding various articles.

Briefly, the epoxy composition of this invention comprises (1) a viscous modified epoxy polymer obtained by the reaction of 1 mol of an aliphatic or alicyclic dicarboxylic acid diglycidyl ester with 0.01–0.5 mol of an aliphatic or alicyclic dicaboxylic acid to form a linear polymer having —OH groups, which is then reacted with 0.01–0.5 mol of an aliphatic or alicyclic dicarboxylic anhydride, and (2) at least one curing agent selected from the group consisting of aliphatic amines, alicyclic amines, polycarboxylic acids, their anhydrides, boron trifluoride amine complexes and trialkanolamine borates.

Examples of the aliphatic or alicyclic dicarboxylic acid digylcidyl esters to be used in this invention are those digylcidyl esters of aliphatic dicarboxylic acids having no carbon-carbon unsaturation in the molecule such as succinic acid, glutaric acid, adipic acid, pimelic acid, sebacic acid or their substitutes; or diglycidyl esters of alicyclic dicarboxylic acids such as hexahydrophthalic acid, hexahydroisophthalic acid, hexahydroterephthalic acid or their methyl substitutes. Further, it is also possible to employ those which have no more than one carbon-carbon unsaturation in the molecule, such as diglycidyl esters of tetrahydrophthalic acid, tetrahydroisophthalic acid, tetrahydroterephthalic acid or their methyl substitutes.

These glcidyl esters can be prepared in a known manner from epichlorohydrin and an alkali salt of a dicarboxylic acid by using, for example, a quaternary ammonium salt or alkali halide as a catalyst. There are all of a low viscosity having two epoxy groups in the molecule.

The modifiers to be used in the present invention are those which contain no carbon-carbon unsaturation or those which contain at most one carbon-carbon unsaturation in the molecule.

In the first modification step, an aliphatic or alicyclic dicarboxylic acid is used to react with the glycidyl ester to partly ring-open the epoxy group in the glycidyl ester at 50–140° C. to form a linear polymer having an alcoholic hydroxyl group.

Examples of the modifiers which may be used in this first modification step are alicyclic acids such as cyclobutane-1,2-dicarboxylic acid, 3,4-dimethylcyclobutane-1,2-dicarboxylic acid, cyclobutane-1,3-dicarboxylic acid, 1,2 cyclopentane dicarboxylic acid, 1-methyl-1,2-cyclopentane dicarboxylic acid, 1,3-cyclopentane dicarboxylic acid, hexahydrophthalic acid, hexahydroisophthalic acid, hexahydroterephthalic acid, 1,5-cyclooctane dicarboxylic acid, etc. and aliphatic acids such as succinic acid, glutaric acid, methyl succinic acid, α-methyl glutaric acid, adipic acid, pimelic acid, sebacic acid, etc.

In the second modification step, an anhydride of an aliphatic or alicyclic dicarboxylic acid is reacted with the above mentioned linear polymer having to obtain a viscous modified polymer which will not gel at the normal temperature.

Examples of the modifiers which may be used in the second modification step are anhydrides of cyclobutane-1,2-dicarboxylic acid, 3,4-dimethylcyclobutane-1,2-dicarboxylic acid, 1,2-cyclopentanedicarboxylic acid, 1-methyl-1,2-cyclopentane dicarboxylic acid, hexahydroisophthalic acid, succinic acid, glutaric acid, etc.

In the first modification step, the dicarboxylic acid is reacted in an amount of 0.01 to 0.5 mol per mol of the glycidyl ester to form a linear polymer of a viscosity of about 10 to 1000 poises at 30° C. When it is less than 0.01 mol, no modifying effect will be obtained, while if it is more than 0.5 mol, the viscosity of the resulting linear polymer will become unduly high finally showing the same fusible solid character as of a usual thermoplastic resin and its workability to form a desired pre-mix will become poor.

In order to adjust the viscosity of the composition and to stabilize the characteristics of the resulting cured product, the second modification step is required.

In this second modifying step, 0.01 to 0.5 mol of an aliphatic or alicyclic dicarboxylic acid anhydride is reacted with the above mentioned linear polymer having an alcoholic hydroxyl group, to obtain a viscous modified polymer of about 100 to 20,000 poises at 30° C. suitable for making a pre-mix in the subsequent operation. Such modification with an acid anhydride is one of the important fetaures of the present invention. Thus, by this second modification, the viscosity of the modified product can be adjusted as desired by properly selecting the kind and relative amount of the linear polymer and acid anhydride. It is even possible to prepare a linear polymer of a comparatively short chain and high in the viscosity.

It is known to employ an acid anhydride as a curing agent to cross-link epoxy resin. In contrast, in the above mentioned modification, it is deemed that by the reaction of the alcoholic hydroxyl group of the linear polymer and the acid anhydride, the acid anhydride will be added to the side chain of the linear polymer and consequently the viscosity will rise. Therefore by controlling the amount of the acid anhydride, the viscosity of the resulting polymer can be adjusted as desired. However, when the amount of the acid anhydride is less than 0.01 mol, no practicable viscosity rise will be able to be attained, while when it is more than 0.5 mol, the acid anhydride will form a three-dimensional structure and there will be formed an undesirable gel.

In the actual operation, even if the acid anhydride is less than 0.5 mol, there is a possibility of the gel formation due to the reaction heat. It is therefore preferable to keep temperature at 50–140° C.

The curing agent to be used must not be such as will elevate the carbon content in the resin composition. Therefore, it is preferable to employ those curing agents whose carbon-carbon unsaturation number is small. The most effective curing agent is that which does not contain such unsaturation in the molecule.

For such curing agents are used aliphatic or alicyclic amines or polycarboxylic acids or their anhydrides. For example, there may be used such amine compounds as diethylenediamine, hexamethylenediamine, diethylene-triamine, hexamethylenetetramine, cyclohexylaminopropyl-amine, monoethanolamine, propanolamine, cyclohexane-diamine and cyclohexanetriamine; and such carboxylic acids as adipic acid, sebacic acid, hexahydrophthalic acid, hexahydroisophthalic acid, hexahydroterephthalic acid, hexahydropyromellitic acid and cyclopentanetetracarboxylic acid or their acid anhydrides. Further, boron trifluoride amine complex compounds and trialkanolamine borate such as, for example, a boron trifluoride ethylamine complex compound and triethanolamine borate which are effective latent curing agents may also be used.

Further, such tertiary amine compounds as, for example, triethylamine, piperidine or benzyldimethylamine may be used alone or together with any other curing agent.

The curing agent may be used in an amount of 0.5–3.0 equivalents, preferably 0.7–2.0 equivalents per epoxy equivalent in a modified polymer resulting from the second modification step.

The composition of this invention consisting of the above mentioned modified polymer and curing agent is viscous and may be cured as such at room or normal temperature or under heating to form a solid article which is excellent in physical properties and high in crack-resistance under severe hot-cold cycled condition.

It is preferable, however, to add conventional fillers and other additives well known in the art of resinous insulating composition of this kind.

Thus it is possible to add other agents such as metal hydroxide, e.g. aluminum hydroxide or magnesium hydroxide or an inorganic filler, such as silica, alumina, calcium carbonate, etc. If desired, flame-retardant, or pigment may be added. It is also possible to add fibrous materials such as glass fibers, asbestos fibers, nylon fibers, polyester fibers, hemp fibers, etc. Such filler may be added in an amount of about 10–75% by weight based on the polymer.

Depending upon the particular use of the composition, it is necessary to dilute the composition in a proper viscosity as putty or premix. For this purpose an organic solvent where the polymer is easily soluble may be used. However, it is preferable to employ a reactive diluent. The reactive diluent should be such that would not adversely affect that characteristics of the composition. As a preferable diluent may be used 1,4-butanediol diglycidyl ether, diethylene glycol diglycidyl ether, triethylene glycol diglycidyl ether or polyethylene glycol diglycidyl ether.

Since the epoxy resin composition of the present invention is made from a new combination of aliphatic or alicyclic compounds containing substantially no carbon-carbon unsaturation so as to reduce the carbon content in the composition, it is possible to prevent a free conductive carbon track from being produced and deposited on the surface when it is exposed to an arc-discharge. Therefore, the cured product is very high in the arc-resistance and tracking-resistance. Further, in the present invention, since there is used the linear polymer subjected to the particular two-step modification, the cured product will be high in the resistance to severe hot-cold cycled condition and has stabilized electric and mechanical characteristics.

However, when the arc-resistance and tracking-resistance may be somewhat sacrificed, it is possible to add a small amount of conventional thermosetting resin such as an epoxy resin or phenol resin or it is possible to employ a small amount of the compounds containing a carbon-carbon saturation in the molecule, for example, tetrahydrophthalic diglycidyl ester or tetrahydrophthalic, in preparing the modified polymer.

The composition of this invention may be cured in a manner well known in the art of curing epoxy resin or its articles.

The composition of this invention is useful in various electric insulative applications. Thus, for example, the composition may be shaped into insulative arms, insulative bolts, insulators, arc shooters, electromagnetic switches and fuse pipes to be used under high voltages and brush holders rods for high speed electric cars.

The invention will be explained in more details by referring to the following examples.

EXAMPLE 1

In a three-necked flask (5-litre volume) fitted with a thermometer and stirrer, there were charged 2840 g. (10 mols) of diglycidyl hexahydrophthalate and 344 g. (2 mols) of hexahydrophthalic acid. The mixture was stirred at 100–110° C. for 3 hours to obtain a linear polymer (viscosity of 150 poises at 30° C.) having an acid value of 1.0 and containing —OH groups. Then 308 g. (2 mols) of hexahydrophthalic anhydride were added to react at 110 to 120° C. for 2 hours. The acid value became 0.5. The oxirane oxygen of the resulting modified linear polymer was 5.2% and its viscosity was 7360 poises at 30° C.

A mixture of 47 g. of hexahydrophthalic anhydride (curing agent) and 0.5 g. of 1-benzyl 2-methylimidazole (curing accelerator) was dissolved in 100 g. of the above mentioned modified resin and further 40 g. of short glass fibers and 300 g. of calcium carbonate were added thereto and kneaded together for about 30 minutes by means of a kneader to obtain a resin composition in the form of a putty.

This putty form composition could be molded into various articles under molding conditions of a temperature of 160 to 190° C., pressure of 10 to 100 kg./cm.$^2$ and molding time of 3 to 7 minutes. A test piece (2.2 mm. in thickness) molded of this composition was of 200 to 240 seconds in the arc-resistance test (by JIS-K-6911) and was of more than 700 v. in the tracking-resistance test (comparative tracking index by the I.E.C. method).

EXAMPLE 2

In the same reaction apparatus as in Example 1, there were charged 2840 g. (10 mols) of diglycidyl hexahydroterephthalate and 146 g. (1 mol) of adipic acid, and the mixture was allowed to react at 120° C. for 3 hours while being agitated, until the acid value became 0.5. When 50 g. (0.5 mol) of succinic anhydride were added to the reaction mixture and further reacted at 120 to 130° C. for 2 hours, the acid value became 0.3.

The oxirane oxygen of the thus obtained modified epoxy resin was 6.0% and its viscosity was about 800 poises at 40° C.

There were added 40 g. of 4-endo-methylene tetrahydrophthalic anhydride to 100 g. of the above modified epoxy resin to obtain a composition of a viscosity of 500 poises at 30° C. A test piece obtained by curing the composition as such had an impact strength of 14 kg.-cm./cm.$^2$ (Charpy method, JIS-K-6911) and was high in toughness. Its arc-resistance was more than 200 seconds and tracking-resistance was more than 700 v. The modified epoxy resin composition of the above mentioned viscosity was suitable to be rendered into the form of a putty by being mixed with any proper kind of fibrous and other fillers. Since the cured product made therefrom was reinforced with fibers, it showed higher impact strength than of the above mentioned plate-shaped test piece.

When such metal hydroxide as aluminum hydroxide or magnesium hydroxide was used as a filler, the heat-resistance and thermal conductivity could be improved and at the same time the arc-resisting characteristics could be also improved.

EXAMPLE 3

In the same flask of a capacity of 1 litre as in Example 1, there were charged 258 g. (1 mol) of diglycidyl adipate and 68.8 g. (0.4 mol) of hexahydroterephthalic acid. The mixture was allowed to react while agitating at 130° C. for 1 hour to obtain a product of an acid value of 1.0. Then 3.1 g. (0.02 mol) of hexahydrophthalic anhydride were added thereto and were further reacted at 100° C. for 3 hours. The oxirane oxygen of the modified epoxy resin thus obtained was 5.2% and its viscosity was 500 poises at 30° C.

There were added 10 g. of triethylenetetramine and 1 g. of triethanolamine borate to 100 g. of the modified epoxy resin and the mixture was cured at the room temperature to obtain a solid product having an impact strength of 12 kg.-cm./cm.$^2$. Further, the arc-resistance and tracking-resistance of this cured product were substantially same as in Example 2.

When the above mentioned composition added with fibrous fillers and other additives, the resulting composition could be shaped into a solid article by simply filling in a mold and leaving to stand at the room temperature.

EXAMPLE 4

50 g. of short glass fibers (of an average length of 5 mm.) and 4 g. of boron trifluoride ethylamine complex compound were uniformly mixed in 100 g. of the modified linear polymer obtained in Example 1 to obtain a composition in the form of a putty.

When the putty composition was placed in a metal mold in which a fixing metal piece had been arranged at each end and was pressed at a temperature of 120° C. under a pressure of 50 kg./cm.$^2$, the composition was cured in 5 minutes to obtain an insulator. At this time, the putty composition did not leak out but was very smoothly cured. In the arc-resistance and tracking-resistance tests, substantially the same results as in Example 1 were obtained. In the cold and heat-resistance impact tests made by assuming the outdoor cold and heat cycled conditions as of an insulator, no crack was seen to occur at all even at 50 cycles. By the way, the above mentioned tests were made under conditions that the product was heated to 120° C. for 3.5 hours and was then immediately cooled to −55° C. for 3.5 hours and showed that the obtained insulator had a high cold and heat-resistance and that the adhesion to the fixing metal piece was also high.

What we claim is:

1. A curable epoxy resin composition which comprises (1) a viscous modified epoxy polymer obtained by the reaction of 1 mol of an aliphatic or alicyclic dicarboxylic acid diglycidyl ester with 0.01–0.5 mol of a first modifier selected from aliphatic and alicyclic acids to form a linear polymer having —OH groups, which is then reacted with 0.01–0.5 mol of a second modifier selected from aliphatic and alicyclic dicarboxylic acid anhydrides, and (2) at least one curing agent selected from the group consisting of aliphatic amines, alicyclic amines, polycarboxylic acids, their anhydrides, boron trifluoride amine complexes and trialkanolamine borates, each of the glycidyl ester, first modifier, second modifier and curing agent containing substantially no carbon-carbon unsaturation.

2. A curable epoxy resin composition as claimed in claim 1 wherein the diglycidyl ester is selected from the group consisting of succinic acid, glutaric acid, adipic acid, pimelic acid, sebacic acid, their substitutes; hexahydrophthalic acid, hexahydroisophthalic acid, hexahydroterephthalic acid, their methyl substitutes; tetrahydrophalic acid, tetrahydroisophthalic acid, and their methyl substitutes.

3. A curable epoxy resin composition as claimed in claim 1 wherein the first modifier is selected from the group consisting of alicyclic acids such as cyclobutane-1,2-dicarboxylic acid, 3,4-dimethylcyclobutane-1,2-dicarboxylic acid, cyclobutane-1,3-dicarboxylic acid, 1,2-cyclopentane dicarboxylic acid, 1-methyl-1,2-cyclopentane dicarboxylic acid, 1,3-cyclopentane dicarboxylic acid, hexahydrophthalic acid, hexahydroisophthalic acid, hexahydroterephthalic acid, 1,5-cyclooctane dicarboxylic acid, etc. and aliphatic acids such as succinic acid, glutaric acid, methyl succinic acid, α-methyl glutaric acid, adipic acid, pimelic acid, sebacic acid, etc.

4. A curable epoxy resin composition as claimed in claim 1 wherein the second modifier is selected from the group consisting of anhydrides of cyclobutane-1,2-dicarboxylic acid, 3,4-dimethylcyclobutane-1,2-dicarboxylic acid, 1,2-cyclopentanedicarboxylic acid, 1-methyl-1,2-cyclopentane dicarboxylic acid, hexahydroisophthalic acid, succinic acid, glutaric acid, etc.

5. A curable epoxy resin composition as claimed in claim 1 wherein the curing agent is selected from the group consisting of such amine compounds as diethylenediamine, hexamethylenediamine, diethylenetriamine, hexamethylenetetramine, cyclohexylaminopropylamine, monoethanolamine, propanolamine, cyclohexanediamine and cyclohexanetriamine; and such carboxylic acids as adipic acid, sebacic acid, hexahydrophthalic acid, hexahydroisophthalic acid, hexahydroterephthalic acid, hexahydropyromellitic acid and cyclopentanetetracarboxylic acid or their acid anhydrides.

6. A curable epoxy resin composition as claimed in claim 1 wherein each of the reaction with the first modifier and second modifier is conducted at a temperature from 50° C. to 140° C.

7. A curable epoxy resin composition as claimed in claim 1 wherein the composition further contains inorganic or fibrous fillers.

8. A method for preparing a curable epoxy resin composition which comprises reacting 1 mol of an aliphatic or alicyclic dicarboxylic acid diglycidyl ester with 0.01–0.5 mol of a first modifier selected from the group consisting of aliphatic acids and alicyclic acids to form a linear polymer having —OH groups, reacting said linear polymer with 0.01–0.5 mol of second modifier selected from the group consisting of aliphatic acid anhydrides and alicyclic acid anhydrides to form a viscous modified polymer, and mixing the modified polymer with at least one curing agent selected from the group consisting of aliphatic amines, alicyclic amines, polycarboxylic acids, their anhydrides, boron trifluoride amine complexes and trialkanolamine borates, each of the glycidyl ester, first modifier, second modifier and curing agent containing substantially no carbon-carbon unsaturation.

9. A method as claimed in claim 8 wherein each of the reaction with the first modifier and the reaction with the second modifier is conducted at a temperature from 50 to 140° C.

References Cited

UNITED STATES PATENTS

| | | | |
|---|---|---|---|
| 3,373,221 | 3/1968 | May | 260—837 |
| 3,476,702 | 11/1969 | Yamamoto et al. | 260—37 |

JOSEPH L. SCHOFER, Primary Examiner

J. KIGHT III, Assistant Examiner

U.S. Cl. X.R.

260—835